United States Patent [19]

Miller

[11] Patent Number: 5,047,856

[45] Date of Patent: Sep. 10, 1991

[54] METHOD AND APPARATUS FOR SHARPENING TELEVISION PICTURES WHILE REDUCING INCIDENTAL NOISE

[75] Inventor: William G. Miller, Knoxville, Tenn.

[73] Assignee: North American Philips Corporation, New York, N.Y.

[21] Appl. No.: 520,693

[22] Filed: May 8, 1990

[51] Int. Cl.$^5$ .................. H04N 5/14; H04N 5/208
[52] U.S. Cl. ..................................... 358/166; 358/167
[58] Field of Search ............ 358/166, 167, 177, 176, 358/37, 171, 162, 96

[56] References Cited

U.S. PATENT DOCUMENTS

| | | | |
|---|---|---|---|
| 2,678,964 | 5/1954 | Loughlin | 358/166 |
| 2,740,071 | 5/1956 | Goldmark et al. | 358/166 |
| 2,851,522 | 9/1958 | Hollywood | 358/166 |
| 2,863,999 | 12/1958 | French | 358/162 |
| 3,946,152 | 3/1976 | Illetschko et al. | 358/162 |
| 4,030,121 | 6/1977 | Faroudja | 358/37 |
| 4,766,489 | 8/1988 | Kato | 358/98 |

Primary Examiner—Victor R. Kostak
Assistant Examiner—Tuan V. Ho
Attorney, Agent, or Firm—Michael E. Marion

[57] ABSTRACT

A method and apparatus for shortening the transition times in a video signal while at the same time reducing incidental noise present during the non-transition portions of the video signal. An adjustable sharpness signal is provided which is modulated by a waveform derived from the video signal. This modulated signal is used to provide a boost to the sharpness signal during transition portions of the video signal. An adjustable noise reduction signal may also be provided to adjust the amplitude response of the non-transition portions of the signal.

6 Claims, 6 Drawing Sheets

METHOD AND APPARATUS FOR SHARPENING TELEVISION PICTURES WHILE REDUCING INCIDENTAL NOISE

BACKGROUND OF THE INVENTION

The invention relates to a method and apparatus for improving the sharpness of television pictures and in particular to use of a modulated sharpness signal which is added to the television signal in order shorten transition times in the television signal while minimizing background noise.

It is known in the art that the transitions occurring in a video signal can be shortened in order to compensate for frequency response degradation during processing, transmission or recording of the signal. In prior art sharpening circuits, the amplitude of the video signal is boosted at mid to high frequencies, or an auxiliary signal derived from the video signal is added to the video signal after correction for phase and delay. Such known circuits are exemplified by the teachings of the following references which are incorporated by reference herein U.S. Pat. Nos. 2,678,964 to Loughlin; 2,851,522 to Hollywood; 2,863,999 to French; 2,740,071 to Goldmark et al.; and 4,030,121 to Faroudja.

In modern television receivers, a sharpness or peaking control signal is used to boost the level of the auxiliary signal prior to combining it with the video signal. The sharpness signal is for example, a D.C. signal having a relatively constant amplitude and is normally adjusted by the viewer according to individual taste. The boosted auxiliary signal, which is commonly a function signal derived from the video signal, is then added to the video signal to provide an output signal which represents the video signal with shortened transition times. One problem with such a circuit however is that any noise present in the auxiliary signal is also boosted in level.

An ideal, noiseless function signal, for example a second derivative of the luminance signal, would not be boosted during non-transition periods (where it is equal to zero). However, if noise is present during the non-transition periods, it will be amplified as a result of the sharpness signal and will effect the total boosted auxiliary signal at all times and not only during the transition portions of the video signal. Since as a practical matter, some noise will always be present, the viewer When adjusting the amplitude of the sharpness signal, must choose between a sharper picture with increased noise content and a picture having reduced sharpness but less background noise. The prior art concentrates on shortening transition times and minimizing pre-shoot, overshoot and ringing. It does not however address the problem of amplified noise resulting from a boosted auxiliary signal.

It is an object of the invention therefore, to provide a sharper television picture. It is a further object of the invention to provide a sharper television picture with reduced noise artifacts.

SUMMARY OF THE INVENTION

Unlike prior art sharpness or "crispening" circuits which concentrate on shortening transition times without concern for accompanying increases in incidental noise, the instant invention combines means for reducing transition times with means for minimizing the effects of noise so that it only minimally influences the non-transition portions of the video signal, thus minimizing the effects of background noise on the television picture.

One embodiment of the invention comprises means for generating from a video signal, a first derived signal and a second derived signal The first derived signal is used to modulate the sharpness signal resulting in a modulated sharpness signal which provides maximum boost during transition portions of the video signal. The modulated sharpness signal is therefore more robust during transition portions, as compared to non-transition portions of the video signal. The modulated sharpness signal is then used to modify the second derived signal resulting in an auxiliary signal which, when combined with the video signal delayed to compensate for the time needed to be combined in phase with the auxiliary signal, provides a greater ratio of transition boost to non-transition boost and hence a television picture with less apparent noise.

Further embodiments of the invention, utilize an additional noise reduction signal which can be controlled either by the user or automatically, to further control the waveshape of the auxiliary signal and therefore the noise during the non-transition portions of the video signal.

The novel features which are considered characteristic for the invention are set forth in particular in the appended claims. The invention itself, however, both as to its construction and its method of operation, together with additional objects and advantages thereof, will be best illustrated and understood from the following description of specific embodiments when read in connection with the accompanying drawings.

BRIEF DESCRIPTION OF THE DRAWINGS

The invention will be more fully understood by reference to the following description of the specific embodiments thereof, taken in conjunction with the drawings in which.

DETAILED DESCRIPTION OF PREFERRED EMBODIMENTS OF THE INVENTION

The instant invention represents an improvement over existing sharpness circuits which are used to improve the effective frequency response of television video signals by shortening the transition times between changes in level within the signal, i.e. the rise and fall times.

Figure 1:
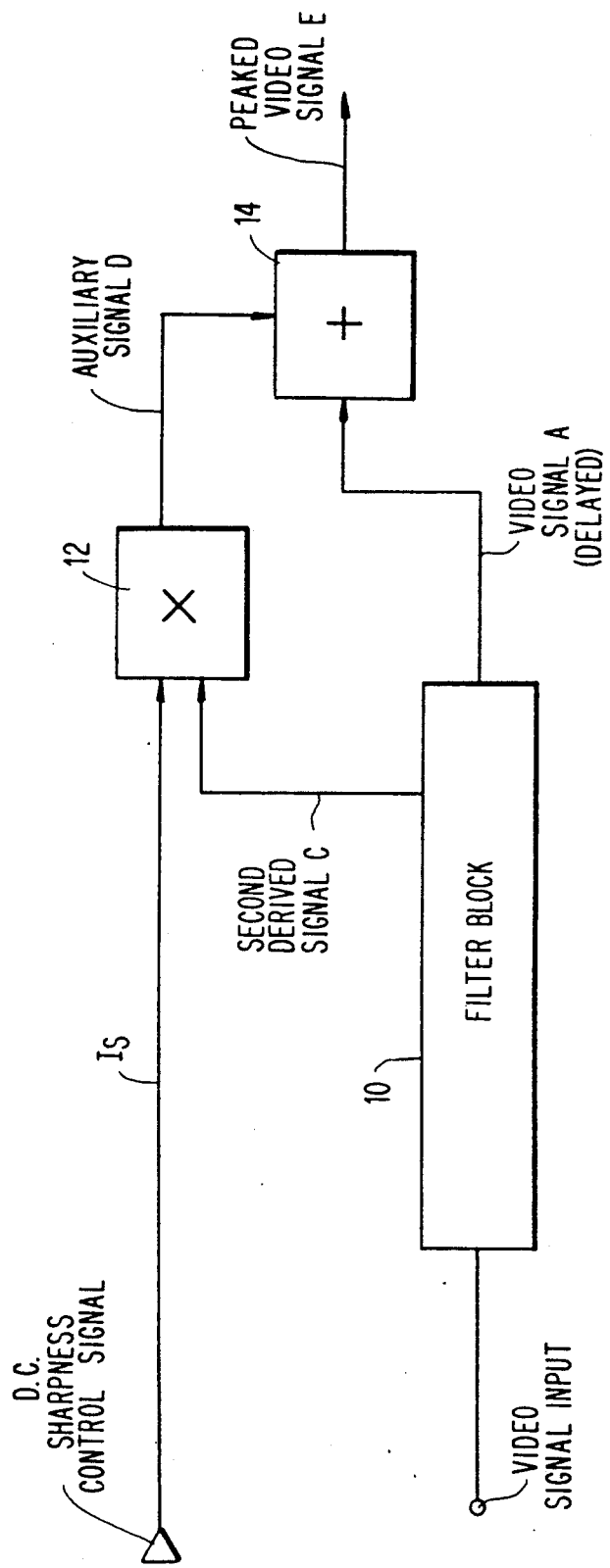
FIG. 1 is a block diagram of a prior art video sharpness circuit.

FIG. 1 describes a prior art sharpness circuit which is used in contemporary television receivers. A sharpness control signal $I_s$, controlled for example by a D.C. voltage, is provided to an input of multiplier 12. The voltage and hence the amplitude of the sharpness control signal Is can be controlled by the viewer and provision for such control is commonly provided on the receiver chassis or remote control device.

A filter block 10 is used to derive from the video signal (usually from the luminance component) one or more waveforms from the video signal. In its most basic form, filter block 10 can be a resistor in series with a delay line. A first derived signal is provided by the voltage across the resistor. A second derived signal is provided by the voltage across an unterminated delay line. The waveform taken at the output of the delay line represents a delayed version of the video signal.

Figure 2:
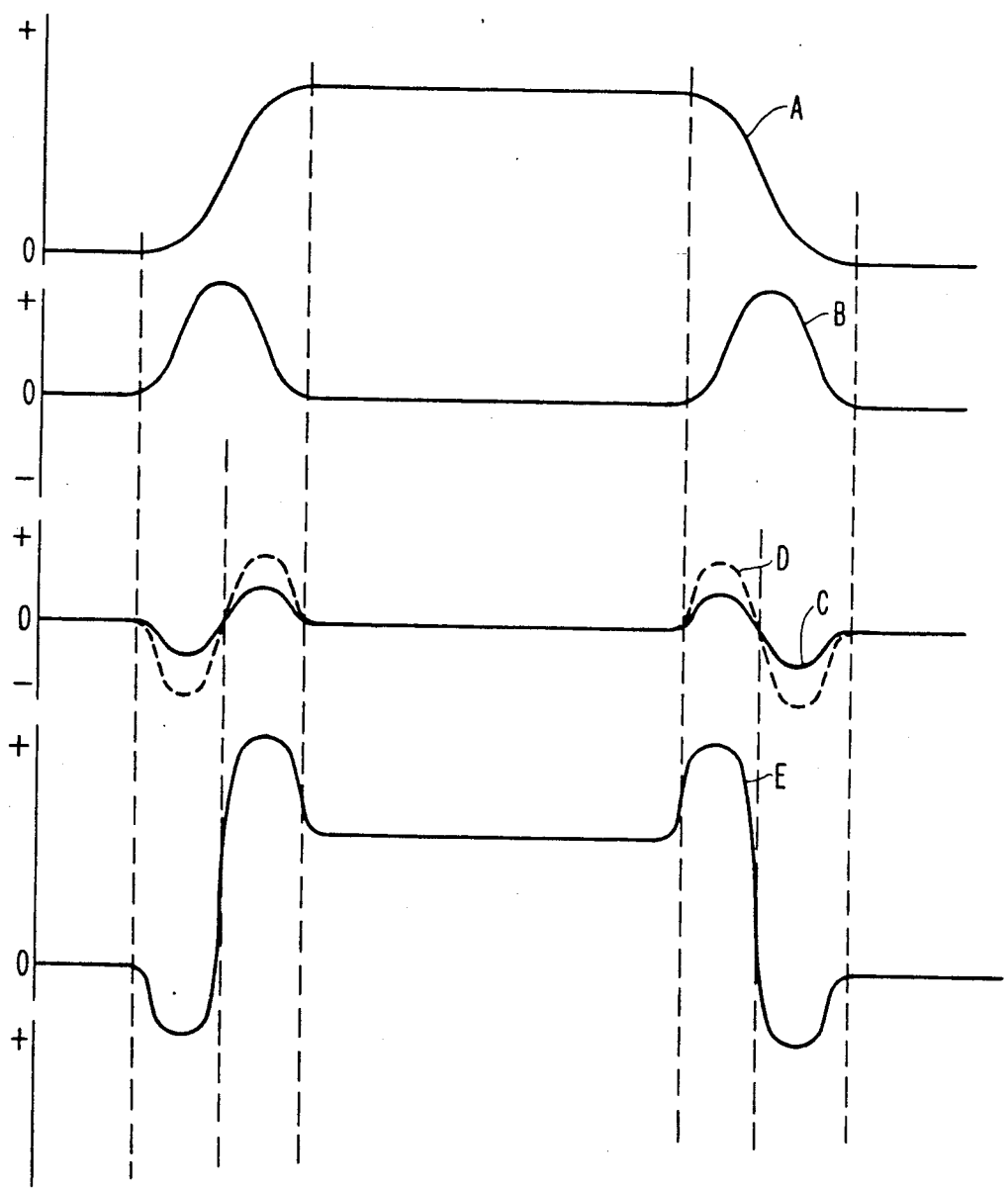
FIG. 2 describes the waveforms processed in the circuit of FIG. 1.

In the circuit shown in FIG. 1 the second derived signal, represented by waveform C (as shown in FIG. 2), is modified, i.e. controlled in amplitude, by the sharpness control signal $I_s$, in multiplier 12. The output of multiplier 12, auxiliary signal D, represents the ideal product of the second derived signal (in this example the second derivative of the video signal) and the sharpness signal, in other words the product where there is no incidental noise to disturb the zero baseline level of the second derived signal. Unfortunately however, there will always be some noise in the video signal and therefore noise in the non-transition portions of the second derived signal will be amplified by the sharpness control signal. Noise in the non-transition portions of the television picture will be more noticeable to the viewer than noise in the transition portions.

The auxiliary signal is then added in phase to the video signal, in adder 14, resulting in an output signal which represents the video signal having shorter transition times (waveform E). This provides an apparent improvement in frequency response (sharpness) of the television picture. The amount of sharpness is therefore affected by the amount of viewer controlled sharpness control signal supplied to the multiplier 12.

As can be seen from waveform E in FIG. 2 however, too much boost (as controlled by the sharpness control signal level) can result in ringing at the peaks of the signal transitions, causing artifacts in the television picture. Also, as discussed above, the amplified noise in the auxiliary signal will result in a boost in the noise throughout the complete output signal, in both transition and non-transition portions.

Some of the references cited herein seek to correct the effects of ringing present in the output signal by modifying the derived waveforms of the video signal prior to combining them with the video signal. The instant invention however, while addressing the ringing problem, is also concerned with minimizing the effects of amplified noise during the non-transition portions of the output signal.

Figure 3:
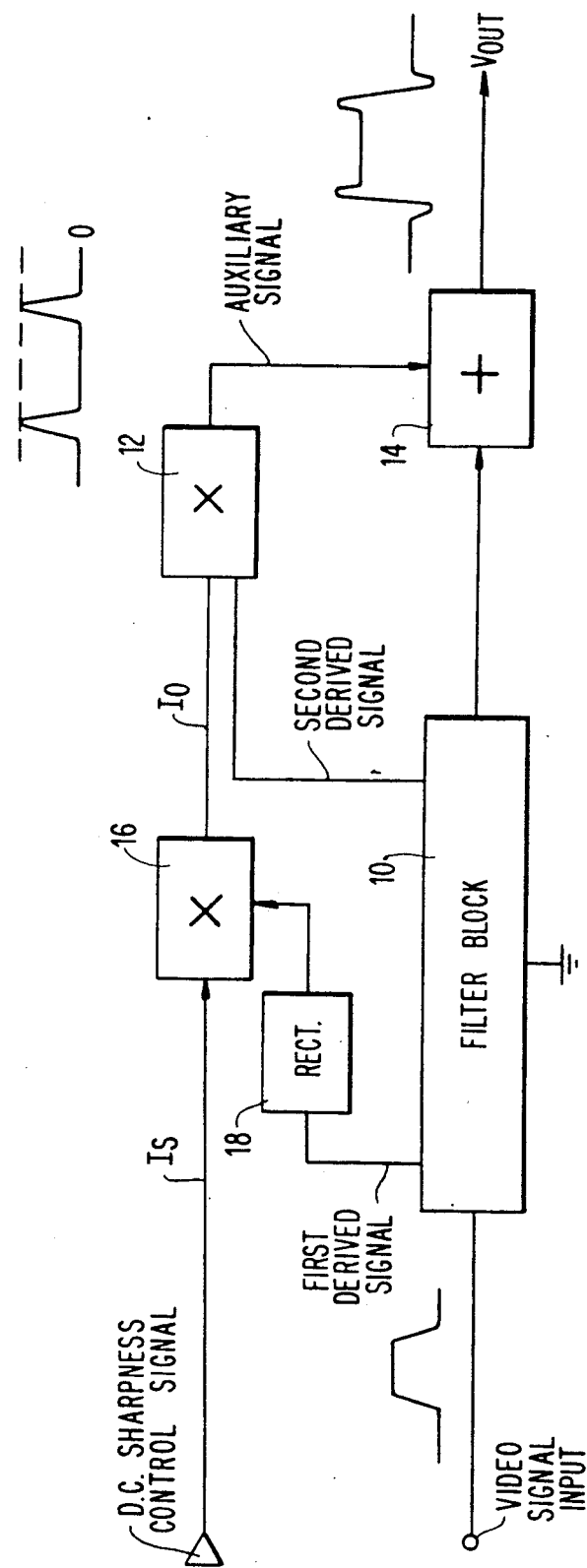
FIG. 3 describes in block diagram form, one embodiment of the invention.

FIG. 3 describes a first embodiment of the invention. As in the circuit of FIG. 1, a voltage waveform derived from the video signal (e.g. the second derived signal C) is modified by a modifying signal in multiplier 12 in order to form an auxiliary signal which is then added in phase to the video signal. Unlike the circuit in FIG. 1 however, the modifying signal is not the sharpness control signal $I_s$. Instead, the sharpness control signal $I_s$ is is modulated in multiplier 16 by another waveform derived from the video signal, for example the first derived signal as described above rectified in rectifier 18 to resemble the waveform B shown in FIG. 2. The amplitude of the first derived signal is adjusted by known means to provide amplification of the sharpness control signal varying between a minimum value (approximately zero) and a maximum value of one. The amplitude of the modifying signal $I_o$ which results from the modulation in multiplier 16 varies from approximately zero during non-transition portions of the video signal, to approximately the amplitude of the sharpness control signal $I_s$ during the peak transition portions of the video signal.

The modifying signal $I_o$ is then combined with the second derived signal in multiplier 12 as described above with respect to FIG. 1, however, because the amplitude of $I_o$ is minimal during the non-transition portions of the video signal and maximum during the transitional portions of the video signal, the boost provided to the second derived signal results in an auxiliary signal having an amplitude which is maximum during the transition portions and minimum during the non-transition portions. The incidental noise which is present in the auxiliary signal is therefore minimal during the non-transition portions of the video signal resulting in less apparent noise in the video output signal of adder 14.

The embodiment of the invention described in FIG. 3 has a disadvantage however in that low level detail present in the video signal may be attenuated if the amplitude of this detail is close to the noise level present in the circuit. Further embodiments of the invention described below, provide means for adjusting the auxiliary signal to vary the amplitude of its non-transition portions while maintaining its peak level. In this manner, the boost provided to the non-transition portions of the video signal can be adjusted separately from the boost provided to the transition portions.

Figure 4:
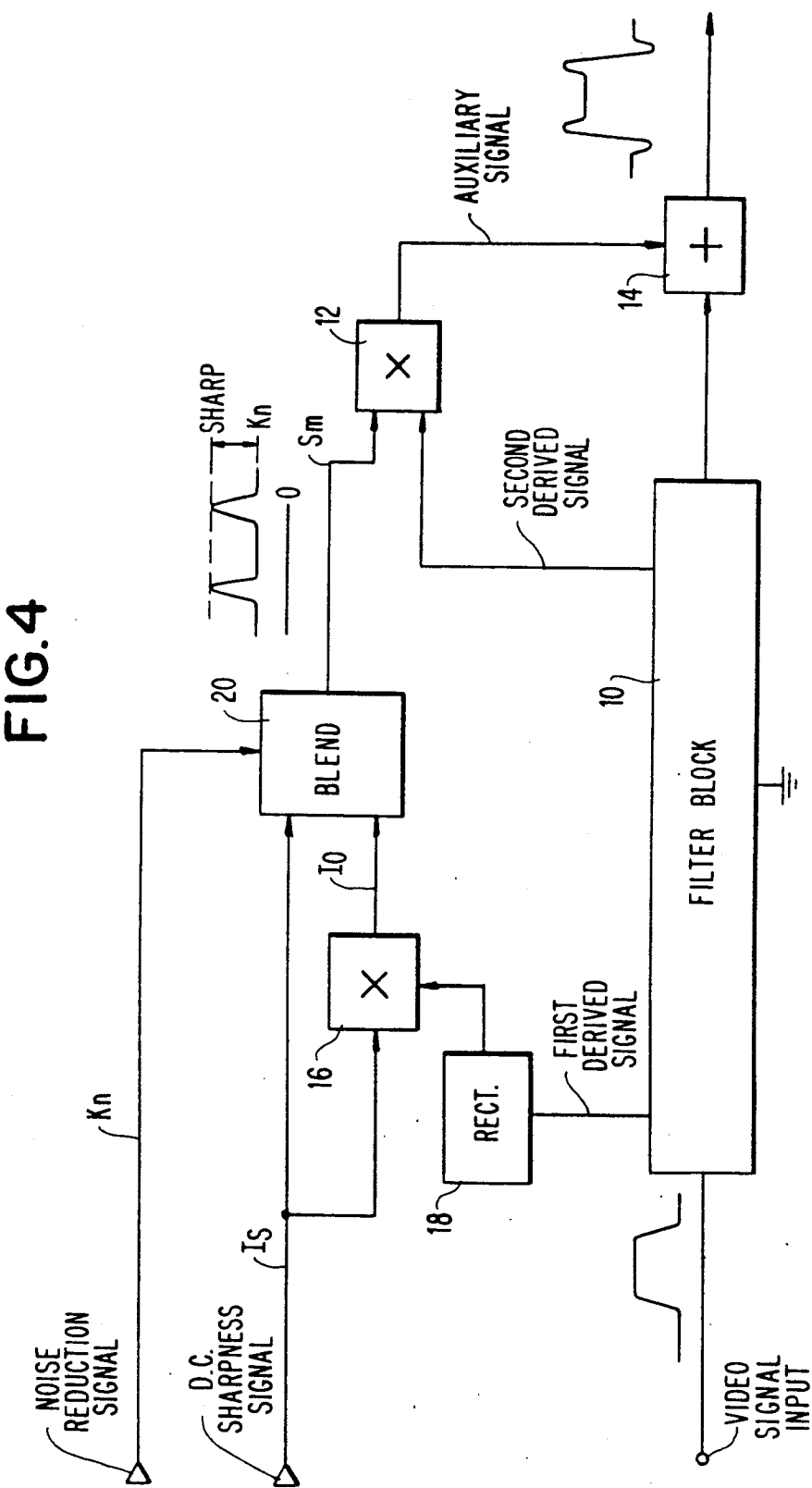
FIG. 4 describes in block diagram form, a second embodiment of the invention.

FIG. 4 describes a circuit which is similar to the circuit of FIG. 3 with the exception that it provides for an additional noise reduction signal $K_n$ which, like $I_s$, is controlled by a voltage controlled by the viewer, or automatically in conjunction with overall signal conditions, and which is used to control a blending circuit 20. The blending circuit 20 has as one input the sharpness signal $I_s$, a second input $I_o$ from multiplier 16 which is derived as explained for example in FIG. 3, and as a third input, noise reduction signal $K_n$. As will be described below in connection with FIG. 5, the amplitude of the noise reduction signal $K_n$ determines the base line amplitude of the blended signal Sm which is provided as the modifying signal to multiplier 12 in order to generate the auxiliary signal combined with the video signal in adder 14. The peak amplitude of the blended signal Sm is controlled by the level of the sharpness control signal $I_s$.

The amplitude of the non-transition portions of Sm can therefore be adjusted by the viewer using the noise reduction signal $K_n$ so that noise levels boosted in modulated sharpness signal $I_o$, can be reduced somewhat during non-transition portions (according to overall subjective taste) in order to "fine tune" the sharpening process, thereby improving the effective frequency response of the television picture while minimizing noise without losing fine details.

Figure 5:
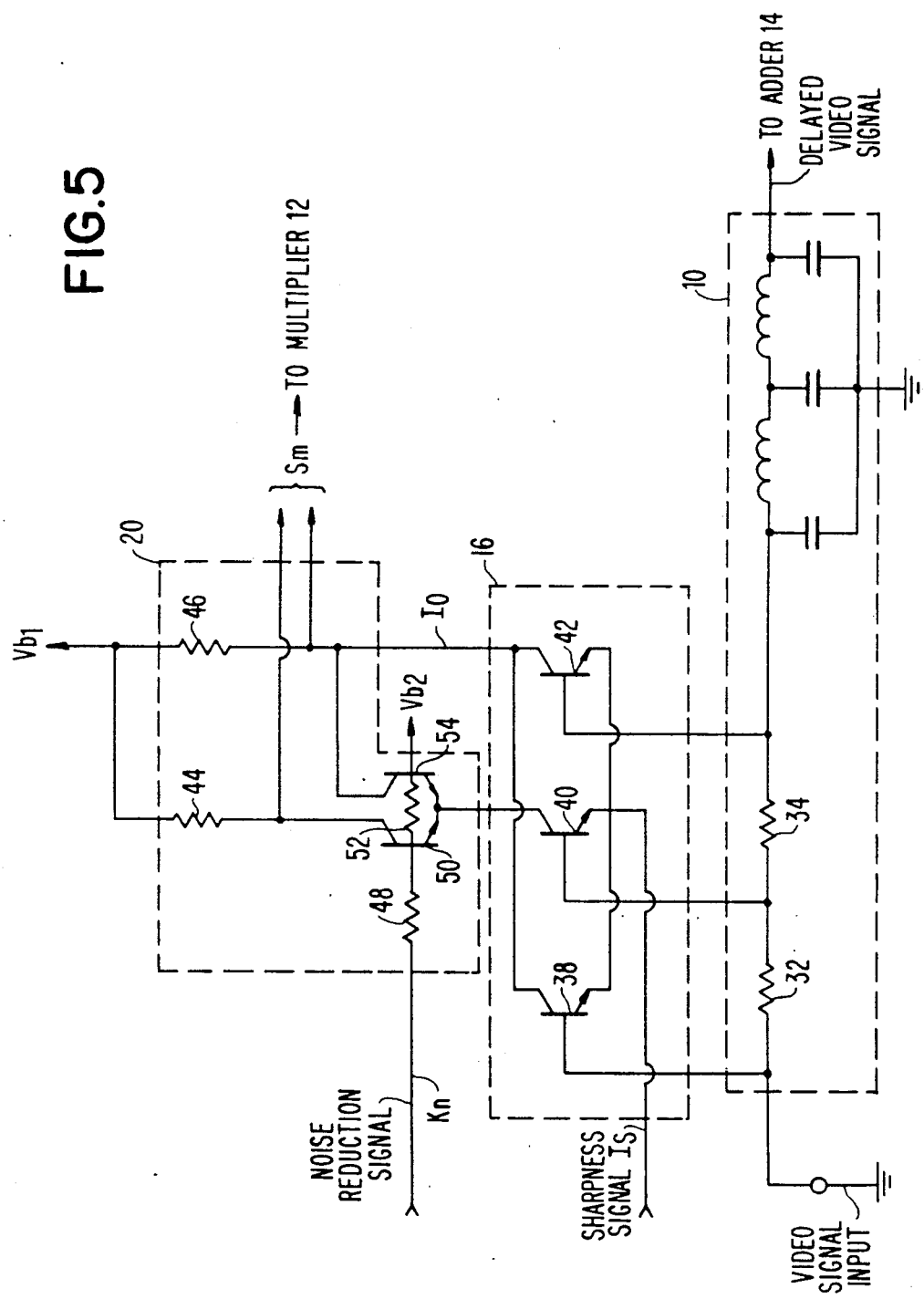
FIG. 5 describes an embodiment of a blending circuit.

FIG. 5 describes a preferred embodiment of a circuit which can be used to provide the modulated signal $I_o$ of the embodiment of FIG. 3 or the blended signal Sm of the embodiment described in FIG. 4. Resistors 32 and 34 and RC network 30 form filter block 10. Multiplier 16 is comprised of parallel transistors 38, 40 and 42. A first derived signal from the video input signal is provided by the voltage across resistor 32 and, with opposite polarity across resistor 34, thereby providing the equivalent of a rectified first derived signal to multiplier 16. The video signal input is provided to the base of transistor 38 and first derived signals of the video signal, of opposite polarities, are provided to the bases of transistors 40 and 42 respectively. The sharpness control signal, $I_s$, is provided to the emitter of transistors 38, 40 and 42. Transistors 38, 40 and 42 are equal to each other and resistors 32 and 34 are of equal value. When no transition is present in the video signal, $I_s$ is split evenly into $I_s/3$ in each transistor. As a result, $I_o = \frac{2}{3} I_s$. When a positive going transition occurs in the video signal, transistor 38 will conduct substantially all of $I_s$, resulting in $I_o = I_s$. When a negative going transition occurs in the video signal, transistor 42 will conduct substantially all of $I_s$, also resulting in $I_o = I_s$. $I_o$, is thus boosted by a factor of 1.5 during transitions of either polarity. As described so far, this circuit can be used in the embodiment of the invention described in FIG. 3 (without the noise reduction signal).

As described in FIG. 4, a blending circuit 20 can be added, comprising a voltage divider (resistors 44 and 46, where the value of resistor 44 is for example twice that of resistor 46) and means for regulating the proportional amount of collector current from transistor 40 flowing through resistors 44 and 46 respectively. This regulating means can, for example comprise resistors 48 and 52 and the differential pair of transistors 50 and 54. Noise reduction signal $K_n$ is applied to base resistor 48 of transistor 50. The blending signal Sm represents the difference between the voltage across resistor 44 and the voltage across resistor 46. Transistors 50 and 52 operate in a complimentary fashion. Vb1 and Vb2 are bias voltages.

If the voltage applied to the base of transistor 50 by noise reduction signal $K_n$ is equal to Vb2, the collector current of transistor 40, will flow equally through transistors 50 and 54 and the non-transition portions of Sm will have an amplitude approximately half way between the amplitude of the non-transitional portions of the first derived signal (approximately zero) and the amplitude of $I_s$. If $K_n = 0$, transistor 50 will not conduct but transistor 54 will, and the circuit will operate as described in FIG. 1, in other words the amplitude of Sm will be essentially equal to $I_s$. As $K_n$ provides a base to emitter voltage to transistor 50 which is increasingly more positive with respect to Vb2, the proportion of the collector current of transistor 40 flowing through transistor 50 increases with respect to transistor 54 according to the formula $I_o = I_s(1/1 + e^{-v/vt})$, and the non-transition portions of Sm will decrease in amplitude approaching the voltage level of the non-transition portions of $I_o$.

Because during the transition portions of the video signal, $I_o$ is least effected by $K_n$, Sm provides a waveform which is substantially uneffected b $K_n$ during transition portions of the video signal but which can be modified during non-transition portions of the video signal to allow adjustment in the amplitude of the auxiliary signal during those non-transition portions and hence more control over incidental noise during those portions.

Figure 6:
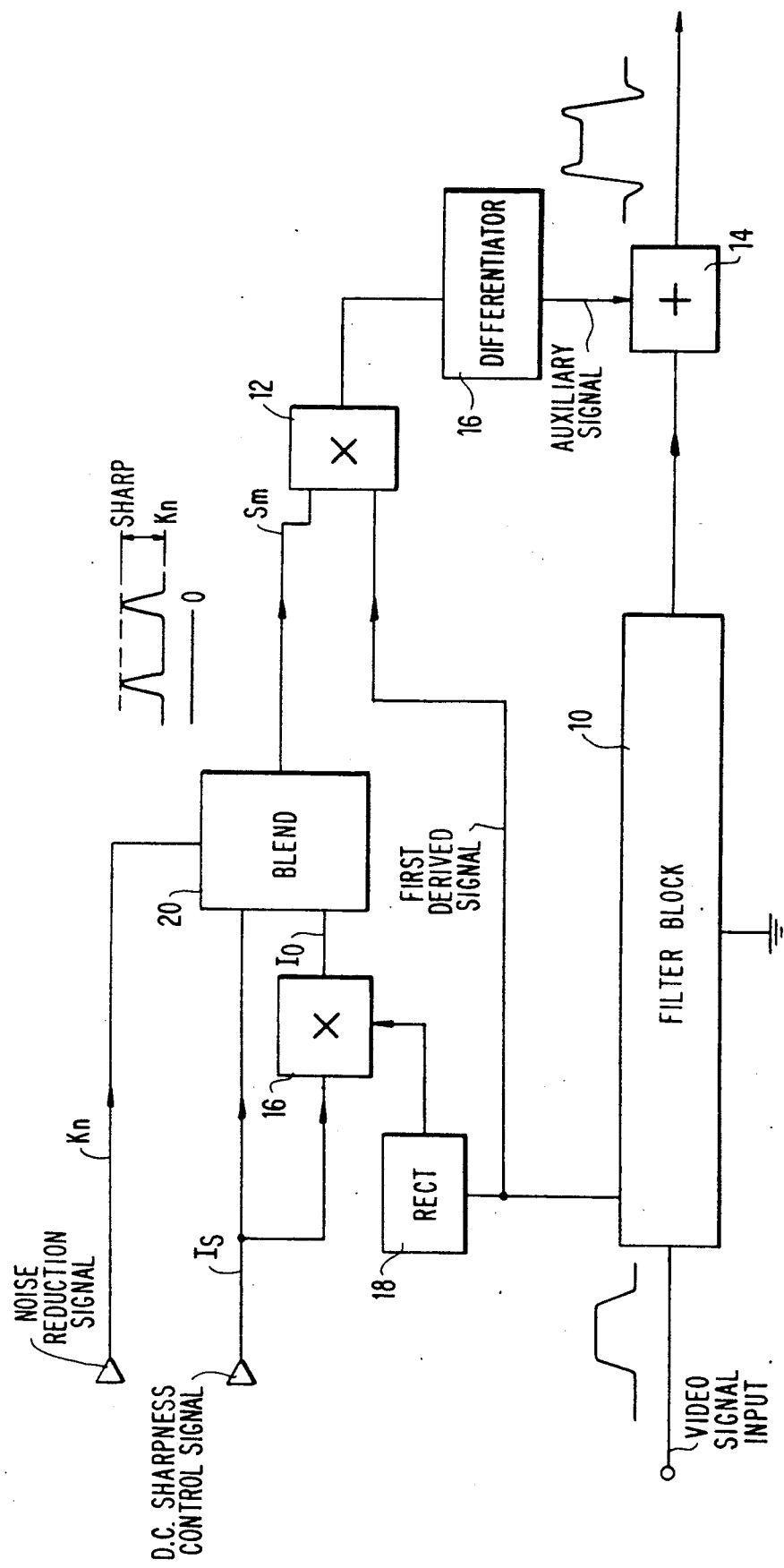
FIG. 6 describes in block diagram form, a third embodiment of the invention.

FIG. 6 describes an alternate embodiment of the circuit described in FIG. 4. In this embodiment however, instead of using a second derived signal as the second input to the multiplier 12, the first derived signal is used. The output of multiplier 12 is then differentiated in differentiator 16 in order to form the auxiliary signal which is then added to the video signal in adder 14.

Although the noise reduction signal $K_n$ is described as a viewer controlled signal, the amplitude of $K_n$ can also be adjusted automatically by means controlled by reception conditions or programmed parameters.

The invention as described herein may be varied in many ways. Such variations are not regarded as a departure from the spirit and scope of the invention, but all such modifications shall be intended to be within the scope of the following claims.

I claim:

1. A method for reducing the transition times in a video signal, comprising the steps of
   a) providing a first signal having a relatively constant amplitude;
   b) deriving a first derived signal from said video signal;
   c) shaping said first derived signal to derive a first shaped signal;
   d) deriving a second derived signal from said video signal;
   e) modulating said first signal with said first shaped signal so as to generate a modulated first signal;
   f) multiplying said second derived signal with said modulated first signal so as to generate a second signal; and
   g) adding said second signal in phase with said video signal so as to produce a video output signal having reduced transition times as compared to said video signal.

2. A method for reducing the transition times in a video signal, comprising the steps of:
   a) providing a first signal having a relatively constant amplitude;
   b) deriving a first derived signal from said video signal;
   c) modulating said first signal with said first derived signal so as to generate a modulated first signal;
   d) multiplying said first derived signal with said modulated first signal so as to generate a second signal;
   e) differentiating said second signal so as to provide a third signal; and 3. An apparatus for reducing the transition times in a video signal, said apparatus comprising:
   a) a first input for receiving said video signal;
   b) a second input for receiving a first signal having a relatively constant amplitude;
   c) means coupled to said first input for deriving first and second derived signals from said video signal;
   d) means coupled to said deriving means, for shaping said first derived signal to form a shaped signal;
   e) first procssing means coupled to said deriving means, for modulating said first signal with said shaped signal so as to generate a modulated first signal;
   f) secondprocessing means coupled to said first processing means, for multiplying said second derived signal with said modulated first signal so as to generate a second signal; and
   g) means coupled to said second processing means, for adding said second signal and said video signal so as to produce a video output signal having reduced transition times as compared to said video signal.

4. An apparatus as described in claim 3, further comprising:
   a) a third input for receiving a third signal having a relatively constant amplitude; and
   b) a third processing means coupled to said third input, said second input and said first processing means and disposed between said first processing means and said second processing means, for providing a fourth signal to said second processing means, said fourth signal comprising a combination of said first and second signals in respective proportions which vary under the control of said third signal.

5. An apparatus for reducing the transition times in a video signal, said apparatus comprising:
 a) a first input for receiving said video signal;
 b) a second input for receiving a first signal having a relatively constant amplitude;
 c) means coupled to said first input for deriving a first derived signal form said video signal;
 d) first processing means coupled to said deriving means, for modulating said first signal with said first derived signal so as to generate a modulated first signal;
 e) second processing means coupled to said first processing means, for multiplying said first derived signal signal with said modulated first signal so as to generate a second signal;
 f) means coupled to said second processing means, for differentiating said second signal; and
 g) means coupled to said differentiating means, for adding said differentiated second signal and said video signal so as to produce a Video output signal having reduced transition times as compared to said video signal.

6. An apparatus as described in claim 5, further comprising:
 a) a third input for receiving a third signal having a relatively constant amplitude; and
 b) a third processing means coupled to said third input, said second input and said first processing means and disposed between said first processing means and said second processing means, for providing a fourth signal to said second processing means, said fourth signal comprising a combination of said first and second signals in respective proportions which vary under the control of said third signal.

* * * * *